United States Patent [19]

Baur et al.

[11] 4,405,210

[45] * Sep. 20, 1983

[54] DISPLAY DEVICE FOR DISPLAYING LIGHT IMAGES ON A DARK BACKGROUND

[75] Inventors: Guenter Baur, Freiburg; Waldemar Greubel; Hans Krueger, both of Munich; Alois Schauer, Gruenwald, all of Fed. Rep. of Germany

[73] Assignee: Siemens Aktiengesellschaft, Berlin & Munich, Fed. Rep. of Germany

[*] Notice: The portion of the term of this patent subsequent to Dec. 23, 1997, has been disclaimed.

[21] Appl. No.: 151,173

[22] Filed: May 19, 1980

Related U.S. Application Data

[63] Continuation of Ser. No. 877,461, Feb. 13, 1978, abandoned.

[30] Foreign Application Priority Data

Feb. 15, 1977 [DE] Fed. Rep. of Germany ....... 2706405

[51] Int. Cl.³ .............................................. G02F 1/13
[52] U.S. Cl. .................... 350/345; 350/337; 350/349
[58] Field of Search ............... 350/345, 349, 337, 340

[56] References Cited

U.S. PATENT DOCUMENTS

| | | | |
|---|---|---|---|
| 3,551,026 | 12/1970 | Heilmeier ............................ 350/349 |
| 3,787,110 | 1/1974 | Berreman et al. .................. 350/341 |
| 3,833,287 | 9/1974 | Taylor et al. ...................... 350/349 |
| 3,864,022 | 2/1975 | Moriyama et al. ................ 350/349 |
| 3,914,022 | 10/1975 | Kashnow ........................... 350/340 |
| 4,042,294 | 8/1977 | Billings, Jr. et al. ............... 350/345 |
| 4,142,781 | 3/1979 | Baur et al. ......................... 350/345 |
| 4,240,711 | 12/1980 | Baur et al. ...................... 350/349 X |
| 4,244,636 | 1/1981 | Baur et al. . |

FOREIGN PATENT DOCUMENTS 2554226 6/1977 Fed. Rep. of Germany .
2619367 11/1977 Fed. Rep. of Germany .
2619368 11/1977 Fed. Rep. of Germany .

OTHER PUBLICATIONS

Castellano, J. A. "Liquid Crystals for Electro-Optical Application," *RCA Review*, vol. 33, (Mar. 1972) pp. 296-310.

*Primary Examiner*—John K. Corbin
*Assistant Examiner*—Richard F. Gallivan
*Attorney, Agent, or Firm*—Hill, Van Santen, Steadman, Chiara & Simpson

[57] ABSTRACT

A display device for displaying bright images on a dark background, which device includes a liquid crystal cell having a liquid crystal layer with switchable zones between at least two optical states, a light trap in the form of a body exhibiting fluorescent particles and having light emergent windows disposed behind each of the switchable zones in the direction of observation, characterized with the liquid crystal layer containing at least one pleochroic dye. The dye in the liquid crystal layer acting by itself or in conjunction with a polarizer can block passage of the fluorescent light during one optical state of the layer and enable passage of the light during the other state.

4 Claims, 1 Drawing Figure

U.S. Patent    Sep. 20, 1983    4,405,210
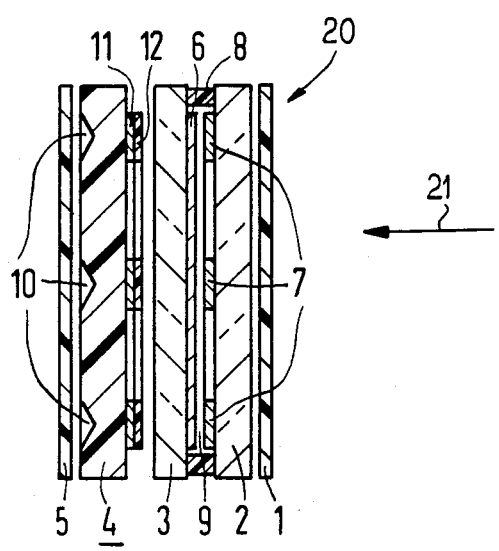

DISPLAY DEVICE FOR DISPLAYING LIGHT IMAGES ON A DARK BACKGROUND

This is a continuation of application Ser. No. 877,461, filed Feb. 13, 1978, now abandoned.

BACKGROUND OF THE INVENTION

The present invention is directed to a display device for displaying bright images on a dark background. The device utilizes a liquid crystal cell which has the liquid crystal layer, that can be switched at zones between two optically different states such as an inoperative state and an operative state, enclosed between two carrier plates with a predetermined wall orientation and the device includes a light trap in the form of a body containing fluorescent particles which body is made of a material with a refractive index of more than 1 and is provided with light emergent or exit windows that are disposed behind each of the switchable zones of the liquid crystal layer in the direction of observation.

In U.S. patent application Ser. No. 747,035, which issued as U.S. Pat. No. 4,142,781 and includes the disclosure of a German patent application P No. 25 54 226, a display device of a liquid crystal cell in conjunction with a light trap having exit windows and containing fluorescent particles was disclosed. Since the fluorescent body traps instant ambient light by the fluorescent dispersion and subsequent total reflection and then conducts it for exit through the exit or emergent windows with an increased intensity, a device of this type gives a particularly strong display. In this device, the amplification of the brilliance is essentially due to the large ratio of the light collecting area of the plate-shaped fluorescent body to the area of the light emitting or exit windows.

If a liquid crystal cell is operated on the basis of the polarization effect, the liquid crystal layer is usually placed between two linear polarizers. However, since polarizers drastically reduce the intensity of the light passing through the cell by filtering out one oscillation plane and in addition by the inevitable absorption that occurs by the polarizer, it is desirable to avoid the use of polarizers if possible. In addition, apart from increasing problems with assembly and durability, the polarizers prevent full exploitation of the very improvements in contrast and enlargement of the reading angle, which improvements were made possible by the light trap which included the fluorescent body.

SUMMARY OF THE INVENTION

The present invention is directed to an improvement of a display device, which at least partially eliminates the polarizer-related limitations which occur with the display devices which utilize a fluorescent body type of light trap, and a provision of a display that creates a very bright image that is also legible or readable from oblique angles.

To accomplish these objects, the present invention is directed to an improvement in a display device for displaying bright images on a dark background, said device including a liquid crystal cell having a liquid crystal layer which is switchable by zones between at least two optically different states, said layer being enclosed by two carrier plates with a predetermined wall orientation; and a light trap in the form of a body containing fluorescent particles, said body being made of material with a refractive index of more than 1 and being provided with a light emergent window disposed behind each of the switchable zones of the liquid crystal layer in the direction of observation. The improvement of this device comprises the liquid crystal layer containing at least one pleochroic dye. Preferably, the dye is of such a nature that the spectral range of its maximum absorption essentially coincides with the spectral range of the maximum emission of the fluorescent particles of the light trap.

For a long time, the implantation of pleochroic dye molecules in a liquid crystal substance as a so-called "guest-host effect" has been known per se. Such additions have also been disclosed in conjunction with a liquid crystal display having a fluorescent plate, but only in conjunction with other measures such as the inclusion of additional illumination means as disclosed in U.S. patent application Ser. No. 791,519 which issued as U.S. Pat. No. 4,167,307 and corresponds to German application P No. 26 19 367 or a light emergent or exit window emitting on a frequency-selective basis as disclosed in German application No. 26 19 368.

The addition of the dye makes at least one of the two polarizers that would otherwise be normally required, superfluous and unneeded. This saving is a particular advantage with an arrangement in accordance with the present invention. If the display contains fewer parts, which weaken the intensity of the light undesirably, a given image brilliance can be achieved with smaller dimensioned fluorescent bodies and this advantage is particularly significant in the case of instruments of compact design such as wrist watches. Since the elimination of the rear polarizer would allow the fluorescent body and the light dispersing layer to be moved closer to the liquid crystal layer, the presence of the dye also enables creation of the required conditions in which the cell can emit the light received from the fluorescent body with a high yield and with a wide aperture angle without appreciable parallax.

If one provides a display with a dye that at least absorbs the fluorescent light, while the liquid crystal is in an inoperative state, but in contrast lets the excitation light for the fluorescent particles pass through unhindered and which dye is transparent at least for the fluorescent light when the cell is in an operative state, a display device with a particularly marked contrast will be achieved. In this case, the fluorescent body can also absorb useful light on all its sides which is covered by the cell.

The same effect can also be obtained without using a dye, which was matched with the frequency of the light emitted by the fluorescent particles. For example, the dye is selected so that in the inoperative state, the liquid crystal layer containing the dye absorbs the excitation light for the fluorescent particles and the fluorescent light emitted thereby at a low level but when the layer is in the operative state, the dye will absorb the fluorescent light at a high level. At the same time, the individual zones of the liquid crystal layer are switched on to the operative state or level only when they belong to the background of the image. Even when the cell is transparent in the inoperative state, the image background still remains almost black. This is due to the fact that only a very tiny proportion of the light trapped in the fluorescent body escapes again outside of the area of the exit windows and the light energy behind the fluorescent body is collected by an absorption film so that the majority of the screen which is not part of the individual display elements is dark. Since the portions of the display elements or switchable zones which are not being utilized in forming the given image, are switched to the operative state, they become substantially dark or black because the liquid crystal cell in the operative state is in a light blocking mode or opaque state. A more detailed discussion of light valves with complementary activation so that they are transparent in the inoperative state but in a light blocking mode while in an operative state is provided in out co-pending U.S. patent application Ser. No. 877,486 filed Feb. 13, 1978, which issued as U.S. Pat. No. 4,244,636.

BRIEF DESCRIPTION OF THE DRAWING

The FIGURE is a cross-sectional view of an exemplary embodiment of a display device in accordance with the present invention.

DESCRIPTION OF THE PREFERRED EMBODIMENT

The principles of the present invention are particularly useful in a display generally indicated at 20 in FIG. 1. The display 20 is illustrated as a single digit display.

The display 20, when viewed in a direction of observation indicated by the arrow 21, comprises a linear polarizer 1, a front carrier plate 2, a rear carrier plate 3, a fluorescent plate 4 and an absorption film 5. On the internal surfaces of the plates 2 and 3, the two plates are provided with transparent conductive coatings forming electrodes. The rear plate has an unbroken continuous electrode 6 and the front plate is provided with a segmented front electrode comprising segments 7. Between the two plates 2 and 3 a hermetically sealing, spacing frame 8 is provided and forms a chamber with the plates which is filled with a liquid crystal layer 9.

The fluorescent plate 4 is provided with light emergent or exit windows with one window being disposed behind each of the segments 7 of the front electrodes when taken in the direction of observation 21. In each case, these windows are composed of an indentation 10, which is on a rear surface of the plate 4 and a dispersive zone or scattering surface 11 which is on a front surface of the plate. Each of the zones 11 may be a pigment layer or a roughened surface zone. In the illustrated embodiment, the dispersive zone contains luminous material that can be excited by tritium, which is a $\beta$-emitter, and the zones 11 are covered by a film 12 containing tritium.

The chosen geometry with the dispersive plane or zones very close behind the liquid crystal layer makes an extremely wide angle observation possible with the parallax-free display. A more detailed description of suitable exit windows if given in our co-pending U.S. patent application, Ser. No. 877,366 filed Feb. 13, 1978 which issued as U.S. Pat. No. 4,240,711. More details concerning the provision of additional illumination means, which utilize radioactive substances, is contained in our co-pending application U.S. Ser. No. 877,367 filed Feb. 13, 1978 and now abandoned.

The liquid crystal layer 9 may be a nematic material, which has a dielectric constant with a negative anisotropy and contains a tiny added quantity of the pleochroic dye. The dye molecules have a property of absorbing the light oscillating parallel with the longitudinal molecule axis but will let light with the plane of oscillation at right angles thereto pass unimpeded. The dye does not need to absorb over the entire visible range, it is only necessary that its range of maximum absorption roughly coincide with the range of maximum emission of the fluorescent particles of the body 4.

As a result of a suitable wall or surface orientation of the carrier plates 2 and 3, the liquid crystal layer 9 including the dye dissolved therein will exhibit a uniformly tilted homeotropic texture when in an unenergized or inoperative state. The direction of the tilt is parallel with the direction of polarization or the axis of polarization of the linear polarizer 1 and the angle of tilt is small and only amounts to a few degrees.

In an inoperative state, the liquid crystal cell will be transparent so that light, which is merely weakened by the single polarizer 1, can pass into the fluorescent plate 4 from the front. If one applies a sufficiently high voltage at one of the segment elements 7, the liquid crystal molecules and thus also the dye molecules in the area of the energized segment 7 will adopt a uniformly homogeneous orientation with a bias parallel with the axis of polarization. In this condition, the cell absorbs the emissions in the area of the zones which are in the operative state.

In the above example, the control device or activating components for the electrodes 6 and 8 are designed so that each of the segments 7 which are not needed to form the image that is to be displayed are activated. The result of this type of activation is that a very bright image is created on a dark background.

If the direction of tilt of the liquid crystal layer was not uniform in the inoperative state, but was twisted through 90° at the carrier plate remote from the polarizer, the molecules of the layer would change to a homogeneous texture with a 90° twist toward the plate normal in an operative state. With this orientation determined by the direction of tilt, the dye molecules absorb at a particularly high level.

Instead of a liquid crystal cell, which is transparent in the inoperative state and is activated in a complementary fashion, one can utilize a type of cell which is light blocking in an inactivated or inoperative state and is light transmitting in the excited state. With this version, it is enough that the liquid crystal layer containing the dye when in an inoperative state absorbs the excitation light at a low level however absorbs the fluorescent light at a high level and when switched to an operative or activated state, it absorbs at least the fluorescent light at a low level.

This type of light valve, which is not switched or operated in a complementary fashion, could be made relatively simply in the following manner. Departing from the structure of the embodiments described hereinabove, the liquid crystal layer will have a dielectric constant with a positive anisotropy and has a uniform homogeneous orientation in the inoperative state with a bias at least approximately parallel with the polarizer axis. This liquid crystal layer will assume essentially the homeotropic texture when switched to the operative state. In the inoperative state, the cell absorbs at a somewhat higher level if the liquid crystal is fixed not in a homogeneous manner but in a twisted homogeneous manner with a 90° twist and a bias parallel with the polarizer axis at the interface near the polarizer.

The present invention is not limited to the described embodiments. Thus, one can combine dyes or a mixture of dyes with a component or liquid crystal material which dye or mixture basically absorbs when their longitudinal molecule axes are parallel with the path of light propagation. The preceding description makes it quite simple to establish a cell in which liquid crystal substances, textures and switching methods are rationally combined to utilize these types of dyes or mixture of dyes.

Although various minor modifications may be suggested by those versed in the art, it should be understood that we wish to embody within the scope of the patent warranted hereon, all such modifications as reasonably and properly come within the scope of our contribution to the art.

We claim:

1. In a display device for displaying bright images on a dark background, said device including a liquid crystal cell having a liquid crystal layer which is electrically switchable by zones between an operative state and an inoperative state, said layer being enclosed by two carrier plates with a predetermined wall orientation; means for individually switching zones of the layer between the operative and inoperative states; and a light trap in the form of a body containing fluorescent particles, said body being made of material with a refractive index of more than 1 and being provided with a light emergent window disposed behind each of the switchable zones of the liquid crystal layer in the direction of observation, the improvements comprising the cell including a single linear polarizer being disposed adjacent one of the carrier plates, the liquid crystal layer having a dielectric constant with a negative anisotropy, said layer, while in the inoperative state, being oriented in a uniformly tilted homeotropic manner with a tilt parallel with the direction of polarization of the linear polarizer, said liquid crystal layer, while in the operative state, assuming an essentially uniformly homogeneous texture with a bias predetermined by the direction of tilt, and said liquid crystal layer containing at least one pleochroic dye, said dye being selected to absorb the excitation light for the fluorescent particles and the fluorescent light emitted by the fluorescent particles at a low level in each zone that is in the inoperative state and to absorb the fluorescent light at a high level in each zone in the operative state so that the zones are only placed in an operative state when the zone belongs to the background of the image.

2. In a display device according to claim 1, wherein each of the light emergent windows includes a surface zone of luminous material excited by tritium on a front surface of the body of the light trap and a film of tritium covering said luminous material.

3. In a display device for displaying bright images on a dark background, said device including a liquid crystal cell having a liquid crystal layer which is electrically switchable by zones between an operative state and in inoperative state, said layer being enclosed by two carrier plates with a predetermined wall orientation; means for individually switching zones of the layer between the operative and inoperative states; and a light trap in the form of a body containing fluorescent particles, said body being made of material with a refractive index of more than 1 and being provided with a light emergent window disposed behind each of the switchable zones of the liquid crystal layer in the direction of observation, the improvements comprising the cell including a linear polarizer disposed adjacent one of said carrier plates, the liquid crystal layer having a dielectric constant with a negative anisotropy, said layer, while in an inoperative state, being oriented in a tilted homeotropic manner with a tilt twisted through 90° towards the plate normal and parallel with the direction of polarization of the linear polarizer at the carrier plate near the polarizer, said layer, while in an operative state, assuming a twisted homogeneous orientation with a bias predetermined by the direction of tilt, and said liquid crystal layer containing at least one pleochroic dye, said dye being selected to absorb the excitation light for the fluorescent particles at a low level in each zone that is in the inoperative state and to absorb the fluorescent light at a high level in each zone in the operative state so that the zones are only placed in an operative state when the zone belongs to the background of the image.

4. In a display device according to claim 3, wherein each light emergent window includes a surface zone of tritium excitable luminous material on a front surface of the light trap and a film containing tritium covering said material.

* * * * *